United States Patent [19]
Eidler et al.

[11] Patent Number: 5,617,337
[45] Date of Patent: Apr. 1, 1997

[54] METHOD AND DEVICE FOR MONITORING SENSOR FUNCTIONS

[75] Inventors: Franz Eidler, Vaihingen; Werner Zimmermann, Stuttgart; Thomas Rüping, Lenningen, all of Germany

[73] Assignee: Robert Bosch GmbH, Stuttgart, Germany

[21] Appl. No.: 322,638

[22] Filed: Oct. 13, 1994

[30] Foreign Application Priority Data

Oct. 20, 1993 [DE] Germany ............... 43 35 700.8

[51] Int. Cl.$^6$ ............... G01D 18/00; G01D 3/02; G05B 23/00
[52] U.S. Cl. ............... 364/551.01; 364/424.039; 364/424.04; 364/431.03; 364/431.11; 73/115; 73/117.3; 73/118.1; 123/425; 123/478; 123/479; 123/486
[58] Field of Search ............... 364/424.03, 424.04, 364/551.01, 431.03, 431.05, 431.06, 431.07, 431.11; 73/115, 117.3, 118.1; 123/479, 425, 478, 198 D, 486

[56] References Cited

U.S. PATENT DOCUMENTS

| | | |
|---|---|---|
| 4,574,265 | 3/1986 | Kaiser et al. ............... 340/52 R |
| 4,730,264 | 3/1988 | Kohler ............... 364/571 |
| 4,914,594 | 4/1990 | Sano ............... 364/424.1 |
| 5,003,954 | 4/1991 | Yakuwa et al. ............... 364/431.11 |
| 5,014,548 | 5/1991 | Tomisawa ............... 73/118.1 |
| 5,216,882 | 6/1993 | Kuroda et al. ............... 60/276 |
| 5,445,014 | 8/1995 | Fiorenza, II et al. ............... 364/431.03 |

FOREIGN PATENT DOCUMENTS

| | | | |
|---|---|---|---|
| 0404069 | 12/1990 | European Pat. Off. ............... 73/118.1 |
| 3428879 | 2/1986 | Germany . | |
| 4122828 | 1/1992 | Germany ............... 123/479 |
| 60069238 | 4/1985 | Japan . | |

*Primary Examiner*—Emanuel T. Voeltz
*Assistant Examiner*—Hien Vo
*Attorney, Agent, or Firm*—Kenyon & Kenyon

[57] ABSTRACT

A method and a device for monitoring the functions of a sensor, in particular of a sensor for detecting a measurable value in a motor vehicle. If specified operating states exist, a measurable value is detected and compared to a reference value. Faults are detected when a measured value, held by the sensor, deviates by more than a tolerance value from a reference value. A measured value which had been detected and stored at an earlier instant when a corresponding operating state existed is used as the reference value.

10 Claims, 3 Drawing Sheets

METHOD AND DEVICE FOR MONITORING SENSOR FUNCTIONS

BACKGROUND OF THE INVENTION

The present invention relates to a method and a device for monitoring the functions of a sensor.

A method and a device for monitoring the functions of a sensor, in particular of a sensor for detecting a measurable value in a motor vehicle, are described in German Unexamined Patent Application No. DE 34 28 879 (corresponding to U.S. Pat. No. 4,730,264). The German application describes a method for continually comparing newly detected measured values with an older stored extreme value. If the new measured value is greater than the extreme value, then the measured value is stored as a new extreme value.

In the automatic feedback control of internal combustion engines, sensors, which function inductively or potentiometrically, and which are connected to a control unit, are often used to detect measurable quantities. Such measurable quantities include, for example, the position of the throttle valve of an Otto (i.e., spark ignition) engine, the position of the control rod of a diesel injection pump, or the position of an accelerator pedal.

During the operational life of a device being monitored, drift effects, due to mechanical wear of the control unit (including any associated limit stops) or contact resistance in the connecting lines leading to the control unit, for example, can corrupt the measured values. Reducing the influences of such effects often entails costly construction or regular servicing and adjustment of such sensors.

The object of the present invention, given a method for monitoring the functions of a sensor, is to detect and, if necessary, to compensate for, occurring drift effects.

SUMMARY OF THE INVENTION

The present invention meets the above mentioned objective by providing a method in which a measured value is detected and stored as a reference value when one of a number of specified operating states, such as the position of a control rod of a diesel injection pump at start-up, exists at a first-time. A measurable value is then detected when the one of the specified operating states exists at a later time. The measurable value detected is then compared with the stored reference value to determine the magnitude of their difference. If the magnitude of the difference is greater than a predetermined tolerance, a fault is determined to exist. The fault may be indicated and/or corrected.

In a preferred embodiment of the present invention, the reference value may be a characteristic curve or map. The specified operating state may be at a start-up operation, at a coasting operation, or at regular intervals.

The present invention also provides a device for implementing this method.

The method and device of the present invention enable drifts in the sensor or in allocated elements, that occur over the lifetime of the control unit, to be detected and, if necessary, compensated.

DETAILED DESCRIPTION

In the following, the device and method according to the present invention are described based on the example of a self-ignition internal combustion engine. However, the method of the present invention is not limited to self-ignition combustion engine control systems. In the depicted exemplary embodiment, a control rod of a diesel engine serves as a controller. The control rod has a first limit stop at which a current (i) applied to its controller is zero and a second limit stop at which a current (i) applied to its controller is maximum. Such a method can also be applied to control systems for internal combustion engines with externally supplied ignition, which employ a throttle valve. The method can also be used with potentiometers to detect the position of an accelerator pedal. The described method is applicable, in principle, to all sensors, in which at least one specific state occurs and a defined measurable value exists.

Figure 1:
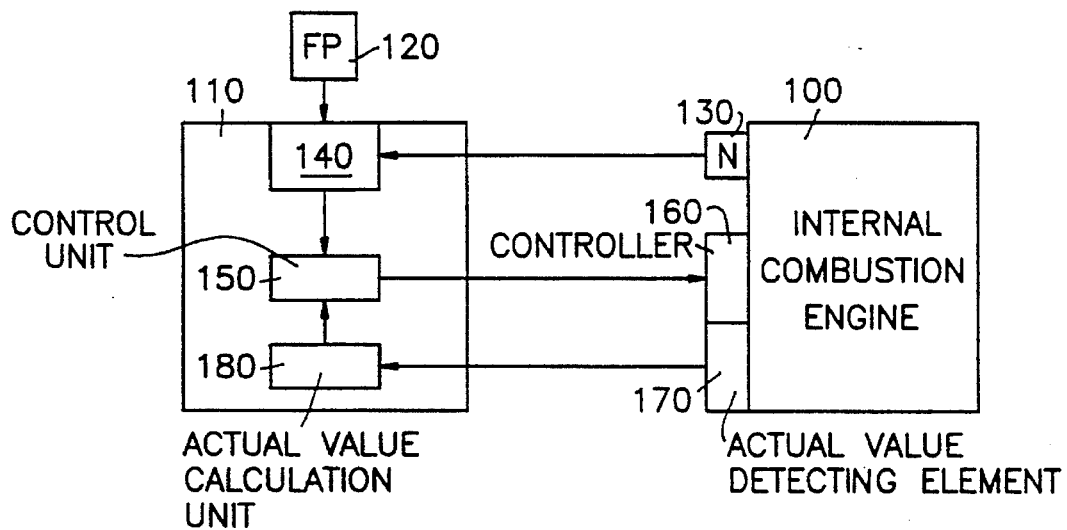
FIG. 1 is a block diagram of a control device for an internal combustion engine.

FIG. 1 is a block diagram of the most essential elements of the device of the present invention. An internal combustion engine 100 is connected to a control unit 110. The control unit 110 processes signals from various sensors 120, which supply measured values.

Additional sensors 130 for supplying various measured values are mounted on the internal combustion engine 100. The control unit 110, and in particular a setpoint selection unit 140, receives the output signals from the sensors 120 and the additional sensors 130. The setpoint selection unit 140 produces a signal to be applied to a control unit 150, which, in turn, applies signals to a controller 160 arranged in the area of the internal combustion engine 100. An actual-value detecting element 170 is arranged on the controller 160. The actual value detecting unit 170 in turn supplies an actual value to an actual-value calculation unit 180. An output signal from the actual-value calculation unit 180 is applied to the control unit 150.

In the case of a diesel engine, the additional sensor(s) 130 is, for example, a sensor for detecting the rotational speed N, the engine temperature, the pressure and/or the temperature of the inducted air, or other operating parameters of the internal combustion engine 100.

The controller 160 is preferably an electromagnetic controlling mechanism for adjusting the control rod. This controlling mechanism receives a current (i) from the control unit 110 (through 150). Depending on the value of the current (i), the control rod assumes a specific position between a first step limit (at which the current (i) is zero) and a second limit stop (at which the current (i) is a maximum). The sensor (i.e., the actual value detecting unit) 170 is connected to the control rod. This sensor 170 supplies a signal value RW based on the actual position of the control rod. The sensor 170 is preferably a potentiometer or an inductive transmitter.

The control device of FIG. 1 operates as follows. The sensors 120 detect values pertaining to the position of the accelerator pedal, the temperature and the air pressure, or additional quantities. Furthermore, the operating parameters of the internal combustion engine 100 are detected by the additional sensors 130. These operating parameters may include, for example, rotational speed, the injection instant, the engine temperature, or other quantities. Based on these measured variables, the setpoint-selection unit 140 defines a setpoint value to be applied to the control unit 150.

A feedback control circuit is usually provided, which adjusts the position of the control element 160 to a specified positional value. For this purpose, an actual-value transmitter 170 is provided, which outputs a measured value RW that corresponds to the position of the control element 160. Based on this measured value, the actual-value-selection unit 180 determines an actual value. The automatic control unit 150 compares this actual value to the setpoint value supplied by the setpoint-value-selection unit 140. Based on the comparison of these two quantities, the control unit 150 supplies a controlled variable to be applied to the controller 160.

The sensor 170, which detects the actual position of the controller 160 and the sensors 120, which detect the position of the accelerator pedal, are preferably inductively or potentiometrically functioning sensors. When these sensors are used, the allocation between the quantity to be measured, for example of the control rod position, or of the rotational angle of the accelerator pedal and the measured value, can change due to manufacturing tolerances or drift in the course of time.

To detect such manifestations of drift (or manufacturing tolerances) and, if need be, to correct them, the following method is employed. During the operational life of the internal combustion engine 100, one or more operating states usually occur many times, in which the operating parameter to be measured by the sensor assumes a defined value.

In the present invention, the measured values detected in this operating state are compared with a reference value which was previously measured when the same operating state existed. The reference value is preferably stored in a non-volatile storage device. If the newly measured value deviates by more than a specified tolerance from the reference value, an unacceptable drift of the sensor is recognized and an indicating means such as, for example, a warning lamp, is switched on to inform the driver of this fault (i.e., unacceptable sensor drift).

Figure 2:
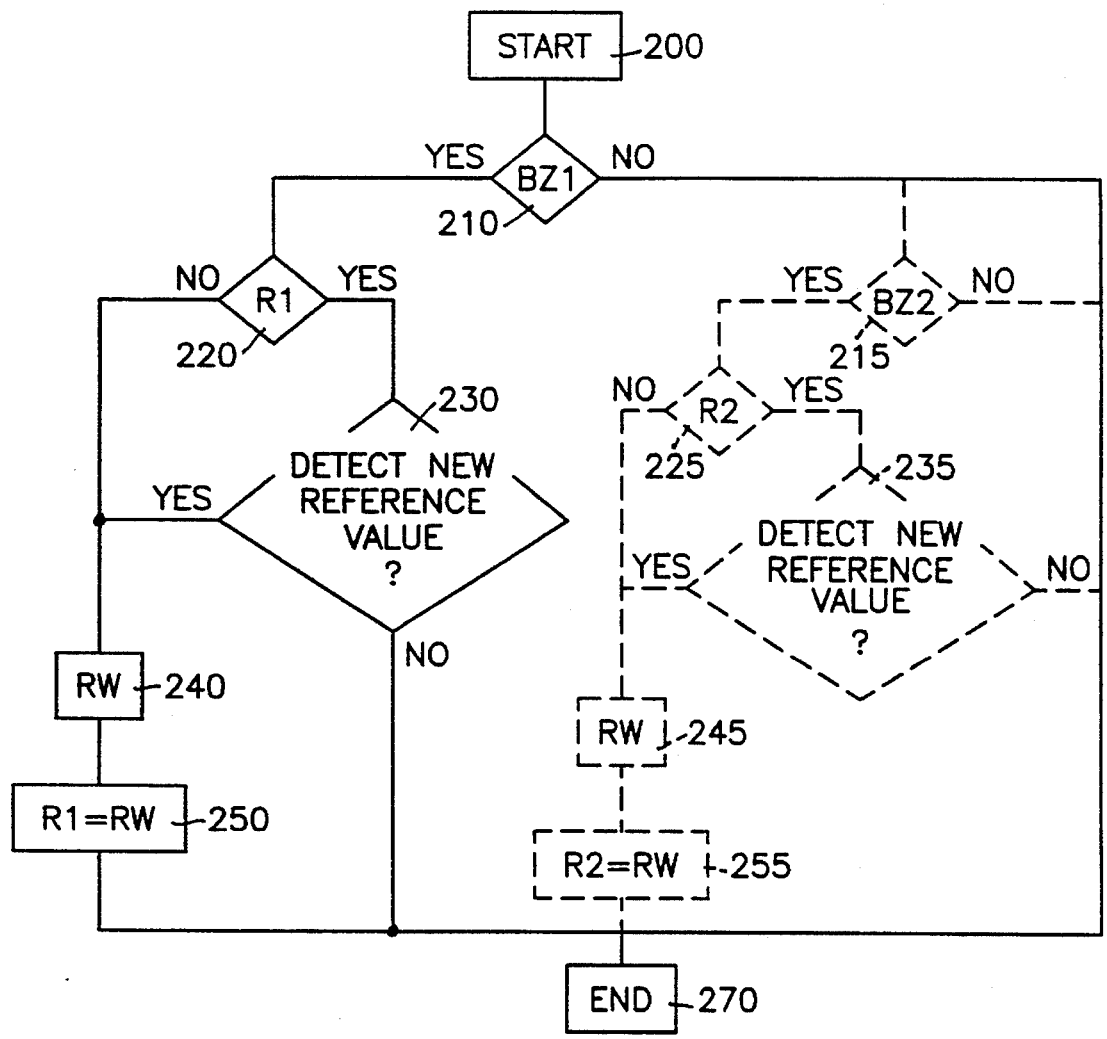
FIG. 2 is a flow chart illustrating steps for acquiring reference values in the method of the present invention.

FIG. 2 is a flow chart for clarifying the procedure for detecting the reference value.

The reference-value is preferably determined when the internal combustion engine is switched off (i.e., when coasting) when the control unit is first switched on (i.e., at start-up), or in regular intervals, for example at every start-up of the internal combustion engine. On the other hand, the program also can be invoked in specific time intervals, or rather after a certain vehicle performance. This program can also be invoked during servicing operations.

One possible operating state BZ1, in which the position of the control rod and, consequently the measured value is known, is at the control rod's first limit stop (at which the current (i) of the controlling mechanism is zero). If the controller 160 is not traversed by current (i) flow, then the control rod assumes an exactly defined mechanical position, the so-called first limit stop position. This operating state exists when the internal combustion engine is switched off or during overrun. However, this state can also be selectively adjusted by the control unit, for example in the so-called coasting operation after the engine has stopped, immediately before the internal combustion engine is started up, or during overrun of the engine.

A second operating state BZ2, in which the position of the control rod and, thus, the measurable value is known, exists when the controller 160 is completely traversed by current (i). In this case, the control rod assumes a second, exactly defined mechanical position, the so-called second limit stop position.

Immediately before start-up of the internal combustion engine, or during a coasting operation, the program for determining the reference value starts in step 200. The program proceeds for as long as the controller 160 is not traversed by current flow (i), or rather, during the time in which the starting quantity is metered in. Alternatively, the reference value can also be determined after the internal combustion engine is stopped, in the so-called coasting operation. The query step 210 checks whether the first operating state BZ1 exists. Thus, for example, whether the trigger current (i) for the controller 160 is zero is checked. If this is the case, step 220 checks whether a first reference value R1 was already stored. If this is the case, then step 230 checks whether a new reference value is supposed to be detected.

Step 230 checks, for example, one or more of the following conditions. For example, whether the voltage being applied, in particular the operating voltage and/or the engine temperature, lies within a specific range is checked. The reference-value is only determined when the operating voltage and/or the temperature lie within a normal range. Reference values are not determined for values existing outside of the normal range. In a further refinement of the step 230, whether a drift flag D is set to 1 is checked. If this is the case, then a new reference value is determined.

If step 230 determines that a new reference value is to be acquired, or if the step 220 determines that no reference value R1 was acquired, then step 240 follows. In step 240 the measurable value RW is detected. The measurable value RW is subsequently stored as a first reference value R1 in step 250.

In one particularly advantageous refinement of the present invention, this stored value (R1) is a characteristic curve or an engine characteristics map depending on various operating conditions. The reference value R1 is preferably stored as a function of one or more of the variables, controlling mechanism current, temperature, rotational speed and/or battery voltage. The fuel temperature, the controlling mechanism temperature and/or the engine temperature can also be considered. Both the engine speed as well as the pump speed can be used as rotational speed.

If the query 230, determines that no new reference value is supposed to be detected, or rather that a new reference value had been stored in step 250, then the reference-value-determination sub-program ends in step 270, and the customary control program follows.

A particularly advantageous refinement of the method of the present invention is depicted in FIG. 2 with dotted lines. In this specific embodiment, a second reference value is determined, in the case of which the control rod is situated at the second stop limit position.

If step 210 determines that a first operating state BZ1 does not exist, then a second query 215 follows. Step 215 checks whether a second operating state BZ2 exists. If this is not the case, then the subroutine ends in step 270. If this is the case, this indicates that the query 215 detects that the controlling mechanism 160 is being fully traversed by current flow (i), and therefore the control rod likewise finds itself in a mechanically well defined position, i.e., in the start (or second) limit stop position.

Thus, step 215 checks, for example, whether the trigger current (i) for the controller 160 has reached the maximum value. If this is the case, then step 225 checks, whether a second reference value R2 has already been stored. If this is the case, then step 235 checks, similarly to query 230, whether a new reference value R2 is supposed to be detected.

If step 235 detects that a new reference value R2 is to be detected, or if query 225 detects that so far no reference value R2 has been acquired, then step 245 follows. In step 245, the measurable value RW is acquired. This means a voltage value is detected, which represents a measure for the control position. This value is subsequently stored in step 255 as a second reference value R2.

In one particularly advantageous refinement, the second reference value R2 is stored depending on various operating conditions in a characteristic curve or in an engine characteristics map. The second reference value R2 is likewise preferably stored as a function of one or more of the quantities controlling mechanism current, temperature, rotational speed and/or battery voltage. The reference values R1 and/or R2 are preferably stored in a non-volatile storage device that is writable at any time.

If step 235 determines that no new reference value R2 is supposed to be detected, or that a new reference value R2 was already stored in step 255, then the reference-value-determination program ends in step 270 and the customary control program follows.

Figure 3:
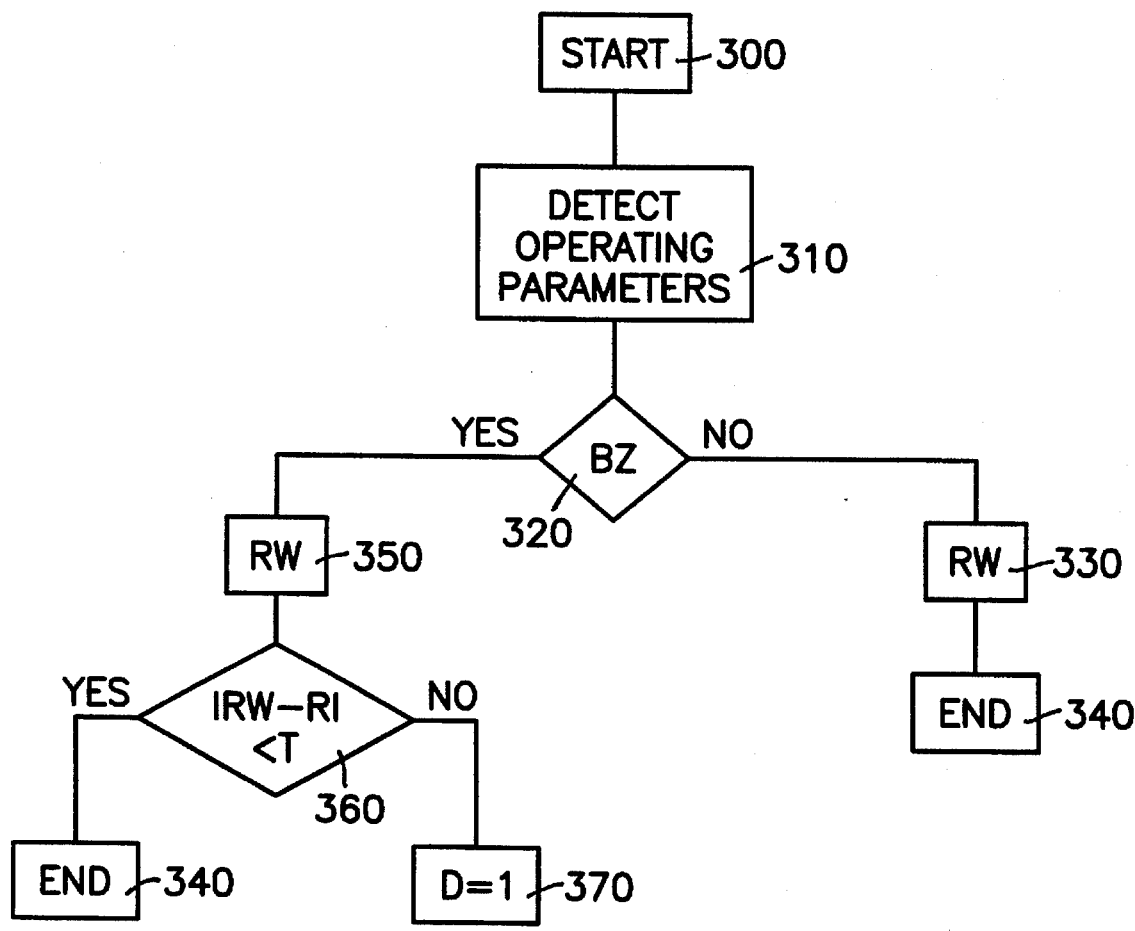
FIG. 3 is a flow chart illustrating steps for detecting a fault.

FIG. 3 is a flow chart for clarifying the method for detecting drifts. This program is run for every measured-value acquisition. The subroutine, measured-value acquisition, starts in step 300. In step 310, various operating parameters are detected. A query 320 subsequently checks whether a specified operating state BZ exists. If this is not the case, the measured value RW is detected in step 330, the subroutine ends in step 340, and the customary control program follows.

If step 320 determines that the special operating state BZ exists, then the measured value RW is detected in step 350. Step 360 subsequently checks whether the magnitude of the difference between the measured value RW and a first reference value R1 (stored in Step 250 of FIG. 2) is less than a tolerance value T. If the measured value RW deviates by more than a tolerance value T from the reference value R1, then the existence of faults is recognized and a drift flag "D" is set in step 370.

In the case of a fault, a warning lamp can be switched on, for example, or rather an emergency driving operation can be introduced. On the other hand, it is also possible to set a drift flag D to 1, which indicates that a drift has occurred. In particular, when two reference values are used, which characterize the lower and upper limit stops of the control rod, the drift can be compensated. The acquisition and storage of new reference values can be induced by setting the drift marker D to 1 in a program in accordance with FIG. 2.

If, on the other hand, the query 360 recognizes that the magnitude of the difference between the measured value RW and the reference value R1 is within the tolerance value T then the subroutine ends, and the customary control program 340 follows.

In accordance with the present invention, the procedure is thus as follows. As described with reference to FIG. 2, at certain instants, for example in the coasting operating, or when the engine is stopped, at which specific, defined operating states usually exist one or more reference values are determined. In the normal operation of the internal combustion engine, when the defined operating states exist, whether the measured value has changed compared to the reference value detected and stored earlier is checked. If a deviation from the stored reference value, greater than a tolerance value exists, faults are recognized. In this case, there is either a drift of the sensor or a change in the mechanical limit stop.

Figure 4:
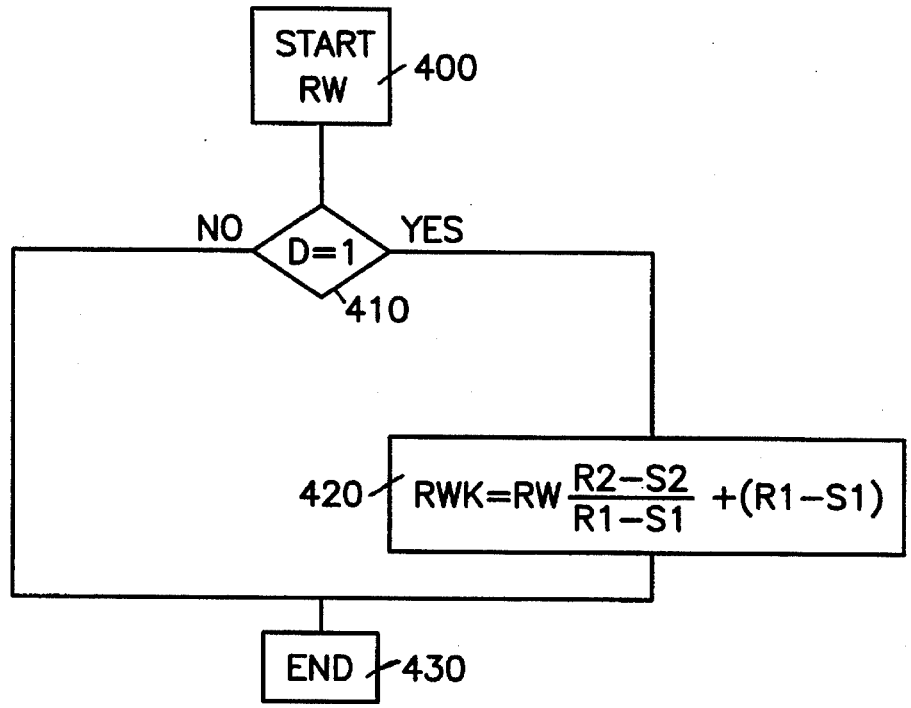
FIG. 4 is a flow chart illustrating steps for correcting the manifestations of drift in the method of the present invention.

The fault detected in this manner is, on the one hand, displayed, and/or an appropriate correction follows. FIG. 4 is a flow chart of such a correction program. This program follows the measured-value acquisition subroutine. For this purpose however, two reference values ($R_1$ and $R_2$) must be detected, as depicted in dotted lines in FIG. 2. If only one reference value exists, then merely a simple off-set correction can take place. If faults were recognized in step 370 in FIG. 3, then the acquired measured values are to be corrected.

In step 400, the correction sub-program starts and the measured value RW is simultaneously acquired. A query 410 follows which checks whether the drift flag D is set to one. If this is not the case, then the subroutine ends in step 430. If the query 410 determines that a drift exists, i.e., that the drift flag D is set to one, then a corrected control path RWK is determined in step 420, based on the measured control path RW and the two reference values R1 and R2. The corrected control path RWK is then used for control purposes.

The corrected control path is preferably determined with the following formula:

$$RWK=RW*(R2-S2)/(R1-S1)+(R1-S1).$$

The values S1 and S2 are those which would result in the normal case for the reference values R1 and R2.

Figure 5:
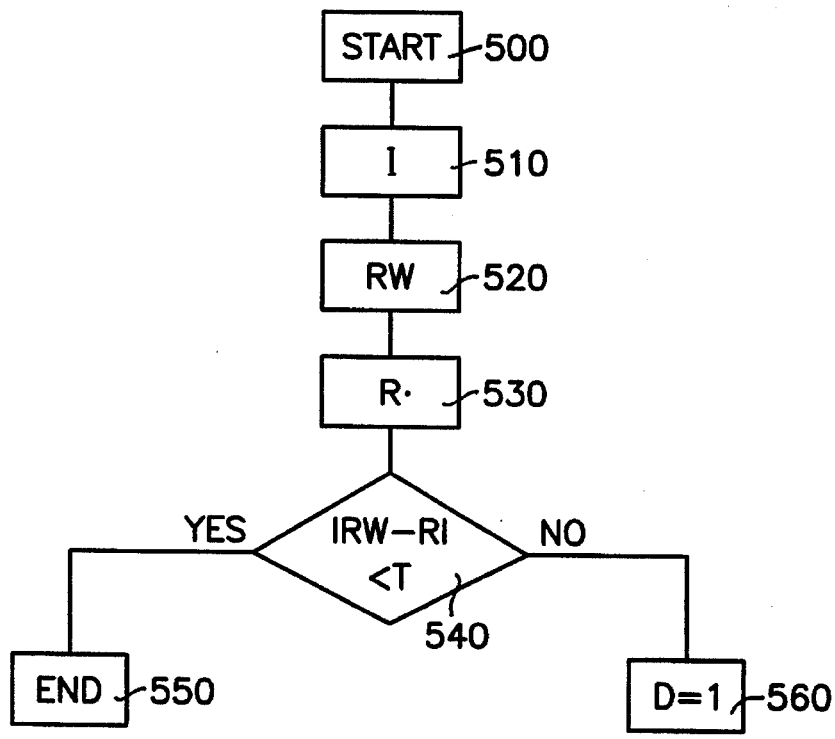
FIG. 5 is a flow chart illustrating steps for detecting a drift.

Another specific embodiment of the present invention is illustrated in the flow chart of FIG. 5. In the specific embodiments described up until now, a drift can always be recognized in certain operating states, in which the controlling mechanism is situated at one of its limit stops. If the current flowing through the magnetic controlling mechanism is known, then the corresponding control-path measured value can be compared to a value from a reference characteristic, which had been picked up during an earlier measurement.

For this purpose, in the procedure illustrated in FIG. 2, a reference characteristic curve, or rather a reference characteristics map, and not individual reference values R1 is stored, depending on operating parameters, as detected in step 200. Preferably the cooling water temperature, the air temperature, and/or the fuel temperature are used as parameters. In this case, the following steps are executed. After start of the program in step 500, the current (i) flowing across controlling mechanism 160 is measured in step 510. The control path RW is subsequently measured in step 520.

In the following step 530, starting from the controlling-mechanism current, a reference value R is read out of a reference characteristics map or a reference characteristic curve. A query 540, corresponding to the query 360 in FIG. 3 then checks whether the magnitude of the difference between the measured value RW and the reference value R is less than a tolerance threshold T. If this is the case, then the program 550 ends. If this is not the case, i.e., if the magnitude of the difference between the reference value R and the measured value RW is greater than a tolerance value T, then drift is recognized and is indicated in step 560, and appropriate measures are introduced.

What is claimed is:

1. A method for monitoring a sensor comprising the steps of:
   (a) detecting a measured value and storing the measured value as a reference value when one of a plurality of specified operating states exists at a first time;
   (b) detecting a measurable value when one of the plurality of specified operating states exists at a second time after the detecting and storing in step (a);
   (c) comparing the measurable value detected in step (b) with the reference value to determine a magnitude of a difference between the measurable value and the reference value; and
   (d) determining a fault when the magnitude of the difference determined in step (c) is greater than a tolerance value, wherein the one of the plurality of operating states includes when a control mechanism is positioned at an end limit stop of the control mechanism.

2. The method of claim 1 wherein the one of the specified operating states is a start-up operation.

3. The method of claim 1 wherein the one of the specified operating states is a coasting operation.

4. The method of claim 1 wherein the one of the specified operating states occurs at regular intervals.

5. The method of claim 1 further comprising the step of:
   (e) indicating the fault when the fault is determined in step (d).

6. The method of claim 1 further comprising the step of:
   (e) correcting the fault when the fault is determined in step (d).

7. The method of claim 6 wherein the correction of the fault in step (e) includes performing at least one of an additive correction following a sensor characteristic curve and a multiplicative correction following the sensor characteristic curve.

8. The method of claim 1 wherein the reference value is a reference characteristic curve.

9. The method of claim 1 wherein the reference value is a reference characteristic map.

10. A device for monitoring at least one function of a sensor comprising:
    a) a reference value storage device for detecting and storing a measured value as a reference value when one of a plurality of specified operating states exists at a first time;
    b) a detector for detecting a measurable value when one of the plurality of specified operating states exists at a second time;
    c) a comparator, operatively coupled with the detector and with the reference value storage device, for comparing the measured value detected by the detector with the reference value; and
    d) a fault detector, operatively coupled with the comparator, for detecting a fault when the measurable value and the reference value differ by more than a tolerance value wherein the one of the plurality of specified operating states includes when a control mechanism is positioned at an end limit stop of the control mechanism.

* * * * *